United States Patent
Shouda

(10) Patent No.: US 10,591,685 B2
(45) Date of Patent: Mar. 17, 2020

(54) OPTICAL CONNECTOR

(71) Applicant: KYOCERA Corporation, Kyoto-shi, Kyoto (JP)

(72) Inventor: Michifumi Shouda, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/326,751

(22) PCT Filed: Aug. 23, 2017

(86) PCT No.: PCT/JP2017/030157
§ 371 (c)(1),
(2) Date: Feb. 20, 2019

(87) PCT Pub. No.: WO2018/038167
PCT Pub. Date: Mar. 1, 2018

(65) Prior Publication Data
US 2019/0196118 A1      Jun. 27, 2019

(30) Foreign Application Priority Data

Aug. 25, 2016 (JP) .................................. 2016-164518

(51) Int. Cl.
*G02B 6/42* (2006.01)
*G02B 6/38* (2006.01)

(52) U.S. Cl.
CPC .......... *G02B 6/421* (2013.01); *G02B 6/4292* (2013.01); *G02B 6/3825* (2013.01); *G02B 6/3854* (2013.01); *G02B 6/3877* (2013.01); *G02B 6/3878* (2013.01); *G02B 6/3893* (2013.01)

(58) Field of Classification Search
None
See application file for complete search history.

(56) References Cited

U.S. PATENT DOCUMENTS 4,741,590 A * 5/1988 Caron .................. G02B 6/3825
                                                              385/60
2012/0051698 A1   3/2012  Hall et al.

FOREIGN PATENT DOCUMENTS

| JP | 63-259605 A | 10/1988 |
| JP | 64-084210 A | 3/1989 |
| JP | 2000-235130 A | 8/2000 |
| JP | 2002-031740 A | 1/2002 |
| JP | 2005-181902 A | 7/2005 |

* cited by examiner

*Primary Examiner* — Jerry Rahll
(74) *Attorney, Agent, or Firm* — Volpe and Koenig, P.C.

(57) ABSTRACT

An optical connector includes a pressing member fitted between two holders along a sleeve. The pressing member includes two pressing portions in contact with surfaces of flanges opposite to the sleeve. The pressing portions press the two holders toward the sleeve. The pressing member has a longitudinal opening with which the pressing member is fitted to cover a joint between the two holders along the sleeve, and has, between the two pressing portions, at least one first slit extending from a position opposite to the opening toward the opening, and at least one second slit separated longitudinally from the at least one first slit and extending from a position adjacent to the opening toward a position away from the opening.

19 Claims, 7 Drawing Sheets

OPTICAL CONNECTOR

FIELD

The present invention relates to an optical connector used to connect optical fibers for, for example, optical communication.

BACKGROUND

In fiber-optic communication, an optical connector is used to connect optical fibers for optical signal transmission. Such an optical connector holds two optical fibers with their end faces facing each other to allow optical signals transmitted through one optical fiber to enter the other optical fiber. The optical connector includes two ferrules, a sleeve, and a pressing member, as described in Japanese Unexamined Patent Application Publication Nos. 64-84210 and 2005-181902.

Each ferrule receives and holds an optical fiber. The tubular sleeve receives the two ferrules inserted through its two ends while the sleeve is slightly expanded. The sleeve holds the ferrules.

However, the optical connectors described in Japanese Unexamined Patent Application Publication Nos. 64-84210 and 2005-181902 each have the pressing member with its bottom plate and pressing portions formed from a bent metal plate. When the pressing member is fitted on the ferrules, the pressing portions are first expanded away from the sleeve to rotate about the bends and then hold the flange between them.

BRIEF SUMMARY

An optical connector according to one aspect of the present invention includes two ferrules each having a first end and having an optical fiber with a tip of the optical fiber inserted through the first end, two holders each having a flange and each flange located on an outer circumferential surface of a corresponding one of the two ferrules at the first end, a sleeve having tubular two ends through which second ends of the two ferrules are inserted into the sleeve, and causing end faces of the optical fibers to face each other and the second ends of the ferrules to abut against each other, and a pressing member fitted between the two holders along the sleeve and including two pressing portions in contact with surfaces of the flanges opposite to the sleeve. The pressing portions press the two holders toward the sleeve. The pressing member has a longitudinal opening with which the pressing member is fitted to cover a joint between the two holders along the sleeve, and has, between the two pressing portions, at least one first slit extending from a position opposite to the opening toward the opening, and at least one second slit separated longitudinally from the at least one first slit and extending from a position adjacent to the opening toward a position away from the opening.

DETAILED DESCRIPTION

Figure 1:
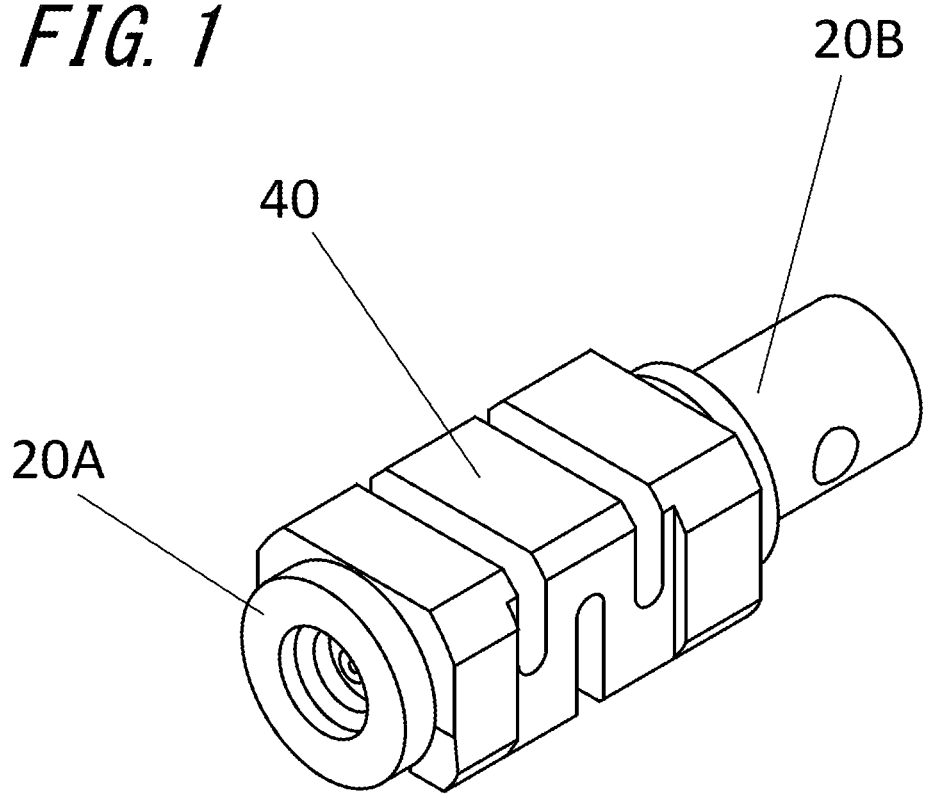
FIG. 1 is a perspective view of an optical connector according to one embodiment of the present invention as viewed from above.
Figure 2:
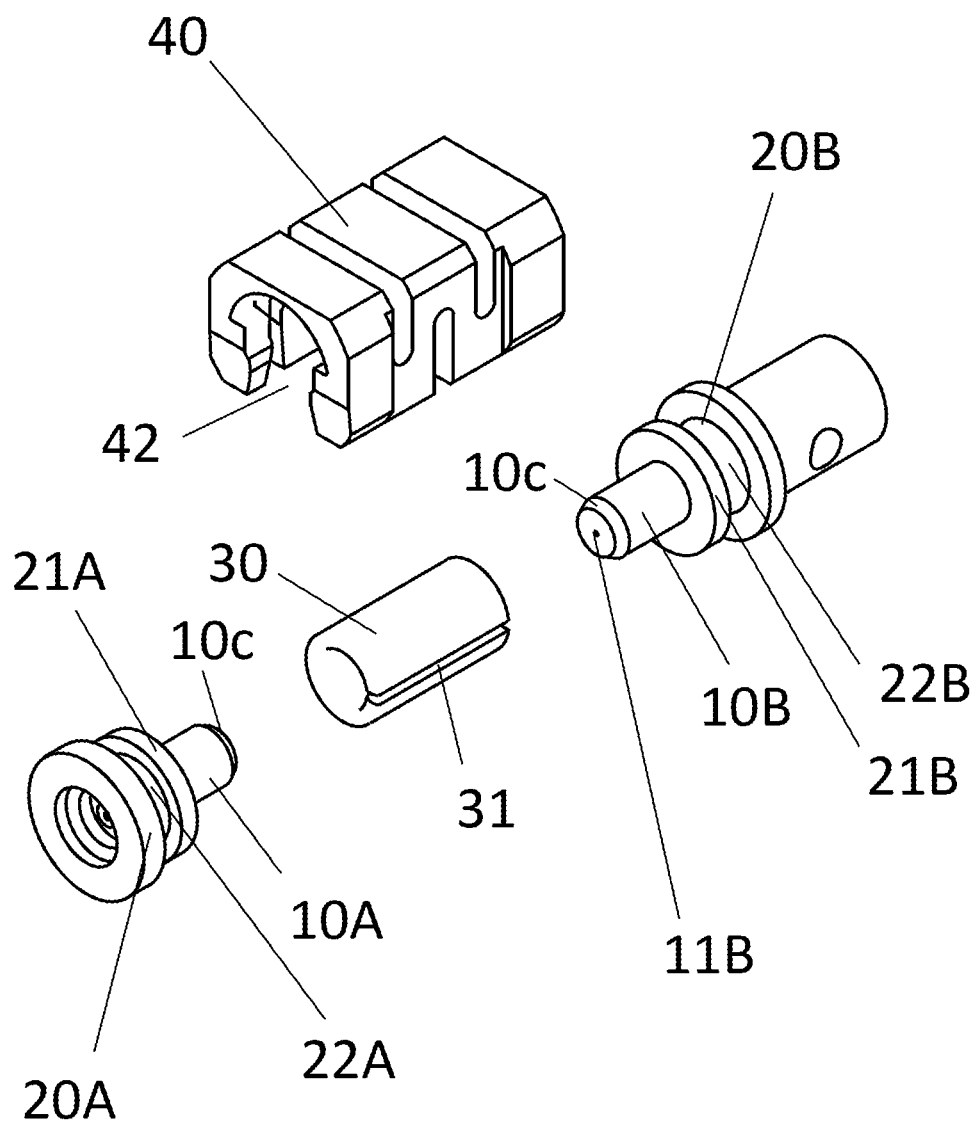
FIG. 2 is an exploded perspective view of the optical connector shown in FIG. 1.
Figure 3:
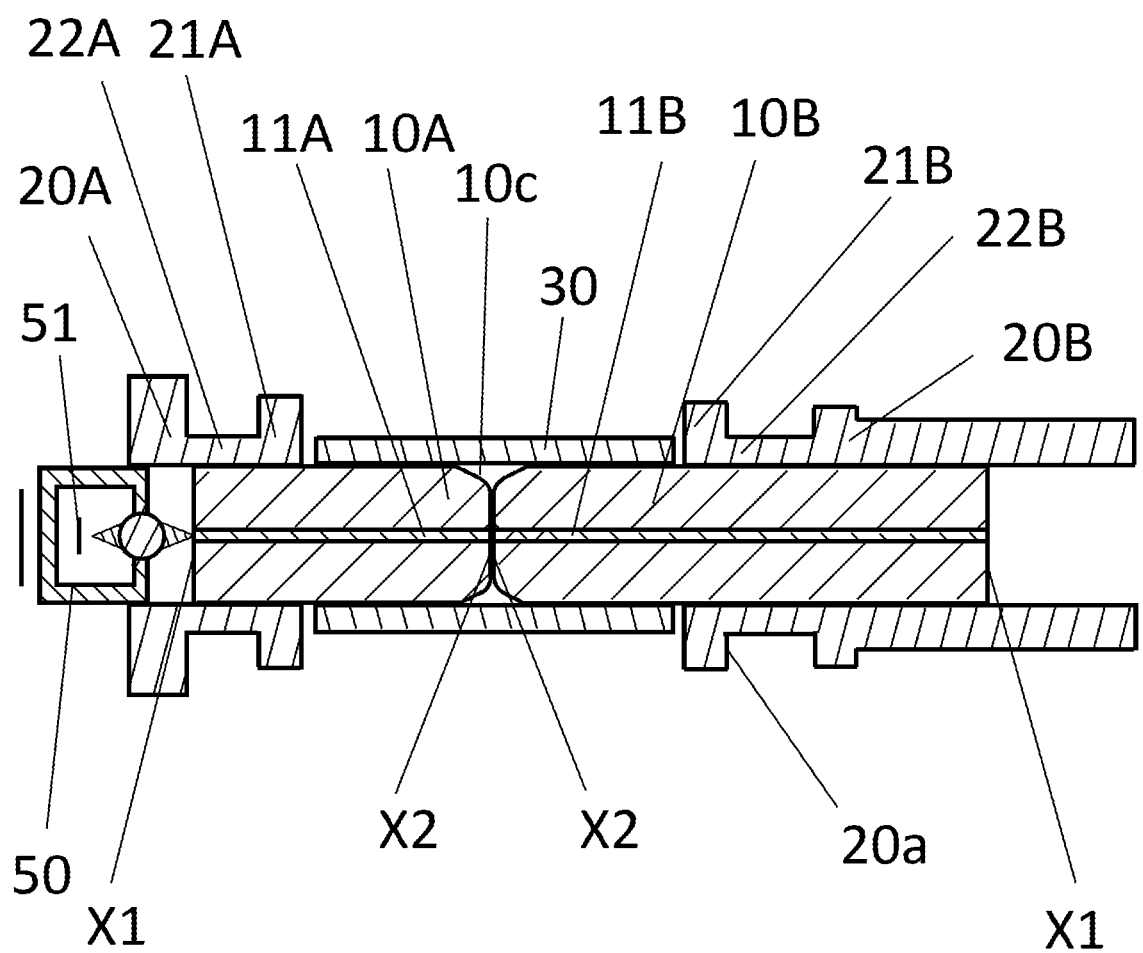
FIG. 3 is a cross-sectional view of the optical connector shown in FIG. 1 with an optical module attached and a pressing member removed, showing the central axis of ferrules, a sleeve, and holders.

An embodiment of the present invention will now be described with reference to the drawings. FIG. 1 is a perspective view of an optical connector according to an embodiment of the present invention as viewed from above. FIG. 2 is an exploded perspective view of the optical connector shown in FIG. 1. FIG. 3 is a cross-sectional view of the optical connector shown in FIG. 1 with an optical module attached and a pressing member removed, showing the central axis of ferrules, a sleeve, and holders.

The optical connector shown in FIGS. 1 to 3 according to the present embodiment includes two ferrules 10A and 10B, two holders 20A and 20B that respectively hold the ferrules 10A and 10B on the outer circumferential surfaces at their first ends X1, a sleeve 30 receiving the ferrules 10A and 10B inserted through its two ends, and a pressing member 40 fitted between the two holders along the sleeve 30 and having a longitudinal opening 42 with which the pressing member 40 is fitted to cover the joint between the two holders 20A and 20B along the sleeve 30. Each of these components will now be described.

Ferrule

The ferrules 10A and 10B are columnar members each having a through-hole extending from the first end X1 to a second end X2. The ferrule 10A holds an optical fiber 11A, and the ferrule 10B holds an optical fiber 11B. The optical fiber 11A (11B) extends across the full length of the ferrule 10A (10B) after its tip is inserted into the through-hole of the ferrule 10A (10B) through the first end X1. The ferrule 10A (10B) and the optical fiber 11A (11B) are coaxial.

The ferrules 10A and 10B are formed from a ceramic material such as zirconium oxide, aluminum oxide, mullite, silicon nitride, silicon carbide, or aluminum nitride. Such a ceramic material may be a main component and may additionally contain a sintering aid selected from manganese oxide, copper oxide, and other materials. In some embodiments, the ferrules 10A and 10B may be formed from a glass-ceramic material containing any of the ceramic materials listed above or from glass materials, for example, crystallized glass such as $Li_2O—Al_2O_3—SiO_2$ or amorphous glass such as borosilicate glass.

The optical fibers 11A and 11B may have an outer diameter of 125 μm as defined by, for example, the Japanese Industrial Standards (JIS) or the Telecommunications Industry Association/Electronic Industries Alliance (TIA/EIA) Standards.

The dimensions of the ferrules 10A and 10B and the optical fibers 11A and 11B will now be described. For the optical fibers 11A and 11B with an outer diameter of 125 μm to be fixed in the ferrules 10A and 10B, the ferrules 10A and 10B may have, for example, an outer diameter of 1 to 3 mm inclusive and a length of 1.5 to 8 mm inclusive.

The ferrules 10A and 10B have chamfered edges 10c at the second ends X2, which are the end faces that abut against each other. Each chamfered edge 10c is continuous with the end face of the second end X2 and the outer circumferential surface. When the ferrules 10A and 10B are inserted into the sleeve 30 described later, the chamfered edges 10c lower the likelihood that the inner circumferential surface of the sleeve 30 and the edges of the second ends X2 of the ferrules 10A and 10B come into contact with each other and cause damage of the ferrules 10A and 10B at the second ends X2.

The ferrules 10A and 10B and the optical fibers 11A and 11B have, at the second ends X2, end faces spherically ground together to have a curvature radius of about 7 to 25 mm. The optical fibers 11A and 11B are spherically ground more easily than the ferrules 10A and 10B. After the spherical grinding, the optical fibers 11A and 11B thus have the end faces at the second ends X2 retracted by about 50 to 100 nm from the end faces of the ferrules 11A and 11B. However, with the second ends X2 abutting against each other, the ferrules 10A and 10B are pressed against each other at the second ends X2 by the pressing member 40 (described later) via the holders 20A and 20B. The end faces of the ferrules 10A and 10B at the second ends X2 are elastically deformed under the force of pressing them against each other, and the end faces of the optical fibers 11A and 11B coming in contact are also elastically deformed under the force of pressing them against each other. The elastic deformation places the end faces of the ferrules 10A and 10B at the second ends X2 into close contact with each other, and also the end faces of the optical fibers 11A and 11B into close contact with each other.

An example method for manufacturing the ferrules 10A and 10B and an example method for holding the optical fibers 11A and 11B in the ferrules 10A and 10B will now be described. With this method, a ceramic material mainly containing zirconium oxide is used as a material for the ferrules 10A and 10B.

A compound for a compact, which is a base of the ferrules 10A and 10B, is first prepared. More specifically, zirconium oxide particles and yttrium oxide particles are sufficiently mixed and milled with a ball mill, and then the mixed powder is further mixed with a binder. The resulting mixture is used as the compound.

The mixture may contain 85 to 99 mass % of zirconium oxide powder and 1 to 15 mass % of yttrium oxide powder, or more specifically, 90 to 98 mass % of zirconium oxide powder and 2 to 10 mass % of yttrium oxide powder. Zirconium oxide power with a zirconium oxide purity of 95% or more, specifically 98% or more, may be used.

A columnar compact with a through-hole along the central axis is then obtained from the prepared compound. More specifically, the compact is obtained by extrusion molding using a die including a pin-shaped member corresponding to the through-hole and a member with an inner circumference corresponding to the outer circumference of the compact. In the extrusion molding, the rotation of an extrusion screw presses the compound to pass through the die to obtain the compact.

The resultant compact is then fired to produce a sintered compact. More specifically, the resultant compact is put into a dewaxing furnace and dewaxed at 500 to 600° C. for 2 to 10 hours. The dewaxed compact is then fired at 1300 to 1500° C. in an oxygen atmosphere for 0.5 to 3 hours to produce a sintered body.

The resultant sintered compact is then cut into intended lengths, and have the inner and outer circumferences ground to complete the ferrules 10A and 10B.

Although extrusion molding allows designs with various lengths, the ferrules 10A and 10B may also be manufactured by injection molding, casting, hydrostatic molding, press molding, or other molding.

The through-holes of the completed ferrules 10A and 10B then receive the optical fibers 11A and 11B having substantially the same length as the full length of the through-holes. The ferrules 10A and 10B are then bonded with the optical fibers 11A and 11B with an adhesive. With the optical fibers 11A and 11B inserted in the ferrules 10A and 10B, the end faces of the ferrules 10A and 10B and the end faces of the optical fibers 11A and 11B at the second ends X2 are spherically ground together to have a curvature radius of about 7 to 25 mm.

Holder

The holders 20A and 20B are used to hold the ferrules 10A and 10B.

The holders 20A and 20B are arranged on the outer circumferential surfaces of the ferrules 10A and 10B at the first ends X1. The holders 20A and 20B each have a hole along the central axis. To hold the ferrules 10A and 10B in the holders 20A and 20B, the ferrules 10A and 10B are press-fitted into the holes in the holders 20A and 20B at the first ends X1 or inserted into the holes and bonded.

The holders 20A and 20B in the optical connector according to the present embodiment respectively include bodies 22A and 22B, and flanges 21A and 21B on the bodies 22A and 22B adjacent to the sleeve 30. For example, the bodies 22A and 22B are cylindrical. The bodies 22A and 22B are coaxial with the ferrules 10A and 10B. More specifically, any protrusions 21A and 21B may extend outward from the cylindrical bodies 22A and 22B, rather than the flanges 21A and 21B located at the ends of the cylindrical bodies 22A and 22B. The flanges 21A and 21B, like the bodies 22A and 22B, are coaxial with the ferrules 10A and 10B.

The bodies 22A and 22B and the flanges 21A and 21B are formed from a metal material such as nickel-plated brass or 18 chrome stainless steel. The body 22A and the flange 21A may be formed as a single unit or separate units joined later. The body 22B and the flange 21B may also be formed as a single unit or separate units joined later.

The bodies 22A and 22B and the flanges 21A and 21B may be formed from a ceramic material such as zirconium oxide, aluminum oxide, mullite, silicon nitride, silicon carbide, or aluminum nitride, like the ferrules 10A and 10B. Such a ceramic material may be a main component and may additionally contain a sintering aid selected from manganese oxide, copper oxide, and other materials. In some embodiments, the bodies 22A and 22B and the flanges 21A and 21B may be formed from a glass-ceramic material containing any of the ceramic materials listed above or from glass materials, for example, crystallized glass such as $Li_2O$—$Al_2O_3$—$SiO_2$ or amorphous glass such as borosilicate glass. The bodies 22A and 22B and the flanges 21A and 21B may also be formed from a resin material such as a liquid crystal polymer, polyethersulfone (PES) resin, or polyetherimide (PEI) resin.

The surfaces of the flanges 21A and 21B opposite to the sleeve 30 come into contact with the pressing member 40 described later. The surfaces of the flanges 21A and 21B of the holders 20A and 20B opposite to the sleeve 30 may be perpendicular to the central axis of the ferrules 10A and 10B to allow the pressing portions of the pressing member 40 to press the surfaces of the flanges 21A and 21B opposite to the sleeve 30 in a direction parallel to the central axis of the optical fibers 11A and 11B.

Sleeve

The sleeve 30 is a tubular member, or more specifically, a cylindrical member. The sleeve 30 has an inner diameter slightly smaller than the outer diameter of the ferrules 10A and 10B. Although the sleeve 30 in the optical connector according to the present embodiment is a split sleeve with a slit 31 along the axis, the sleeve 30 may be a precision sleeve with no slit 31.

The sleeve 30 receives the second ends X2 of the two ferrules 10A and 10B through its two tubular ends. In the sleeve 30, the second ends X2 of the ferrules 10A and 10B abut against each other, and the end faces of the optical fibers 11A and 11B face each other.

When the ferrules 10A and 10B are inserted through two ends of the sleeve 30, the slit 31 slightly widens to increase the inner diameter of the sleeve 30. The sleeve 30 holds the inserted ferrules 10A and 10B coaxially under the elastic force.

The ferrules 10A and 10B and the optical fibers 11A and 11B have their end faces at the second end X2 spherically ground together. With the second ends X2 abutting against each other, the ferrules 10A and 10B are pressed against each other at the second end X2 by the pressing member 40 (described later) via the holders 20A and 20B. Thus, the end faces of the ferrules 10A and 10B at the second ends X2 are elastically deformed under the force of pressing them against each other, and the end faces of the optical fibers 11A and 11B are also elastically deformed under the force of pressing them against each other. The elastic deformation places the end faces of the ferrules 10A and 10B at the second ends X2 into close contact with each other, and also the end faces of the optical fibers 11A and 11B into close contact with each other. This facilitates optical coupling between the optical fibers 11A and 11B inserted in the ferrules 10A and 10B.

The sleeve 30 may be formed from a ceramic material such as zirconium oxide, aluminum oxide, mullite, silicon nitride, silicon carbide, or aluminum nitride, like the ferrules 10A and 10B. Such a ceramic material may be a main component and may additionally contain a sintering aid selected from manganese oxide, copper oxide, and other materials. In some embodiments, the sleeve 30 may be formed from a glass-ceramic material containing any of the ceramic materials listed above or from glass materials, for example, crystallized glass such as $Li_2O$—$Al_2O_3$—$SiO_2$ or amorphous glass such as borosilicate glass.

For the sleeve 30 as a split sleeve, the longitudinal slit 31 facilitates moderate elastic deformation of the sleeve 30 when the ferrules 10A and 10B are inserted into the sleeve 30.

For the ferrules 10A and 10B with an outer diameter of 1.25 mm for example, the sleeve 30 before receiving the ferrules 10A and 10B has an inner diameter of 1.248 mm. The slit 31 may have a width of 0.1 to 0.4 mm inclusive. The sleeve 30 has a thickness of about 0.1 to 0.5 mm and a length of about 2.8 to 15 mm.

When the sleeve 30 receives the ferrules 10A and 10B, the ferrules 10A and 10B expand the sleeve 30 to an inner diameter of 1.25 mm. In this state, the sleeve 30 reliably holds the ferrules 10A and 10B under the elastic force.

The method for manufacturing the ferrules 10A and 10B may also be used to produce the sleeve 30 using, for example, a ceramic material including zirconium oxide as a main component.

Optical signal transmission with the optical connector will now be described with reference to FIG. 3. In the example described below, the holder 20A has an optical module 50 serving as a transmission module including a light-emitting device 51. The light-emitting device 51 in the optical module 50 emits light, which enters the optical fiber 11A through the first end X1 of the ferrule 10A, travels through the optical fiber 11A from left to right in FIG. 3, and exits the optical fiber 11A through the end face at the second end X2. The light then enters the optical fiber 11B through the end face of the ferrule 10B at the second end X2, and travels through the optical fiber 11B. In this manner, optical signals are transmitted. For the optical module 50 serving as a reception module including a light-receiving device, optical signals will be transmitted in the reverse direction.

Pressing Member

Figure 4:
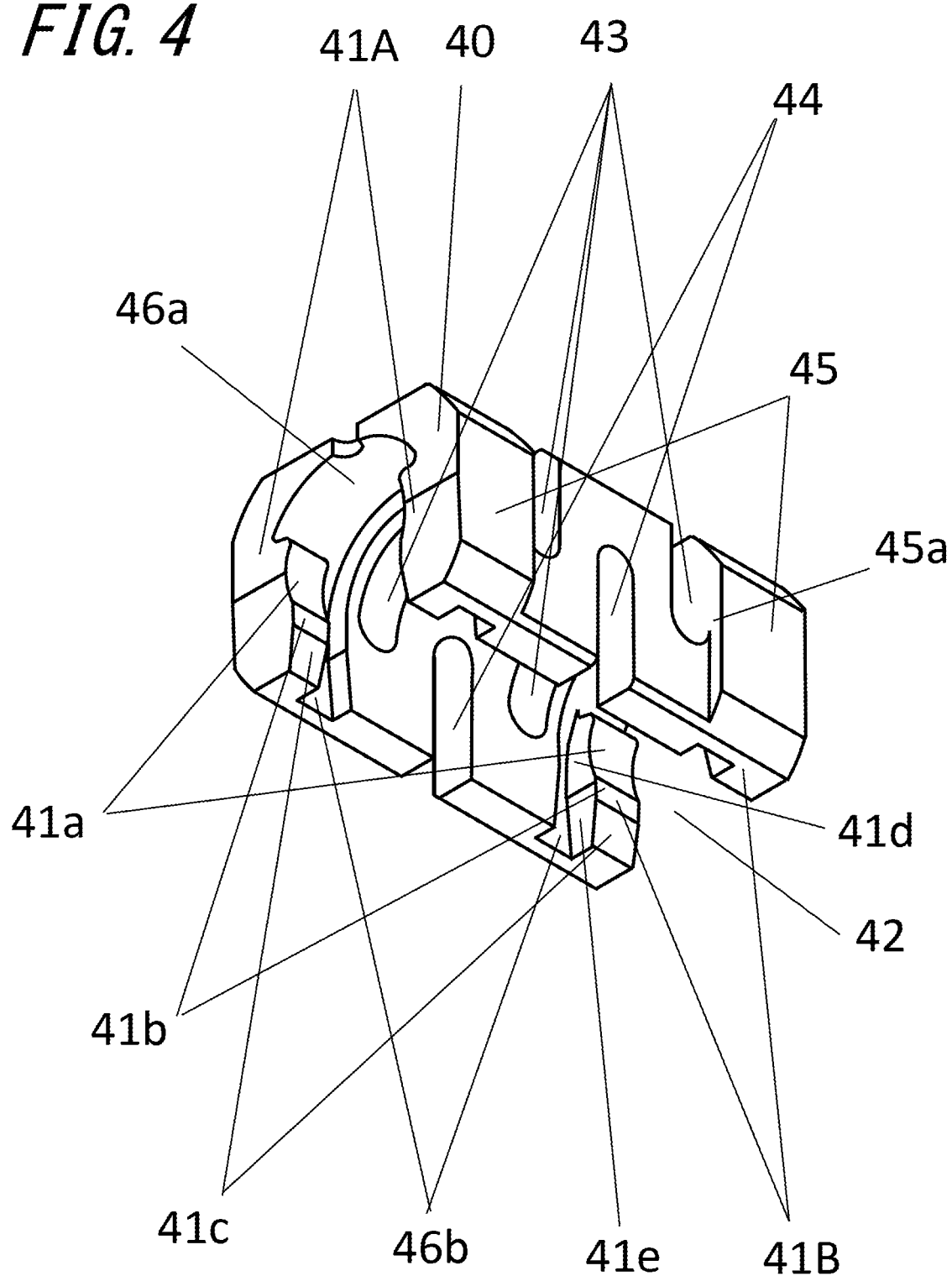
FIG. 4 is a perspective view of the pressing member in the optical connector shown in FIG. 1 as viewed from below.
Figure 5A:
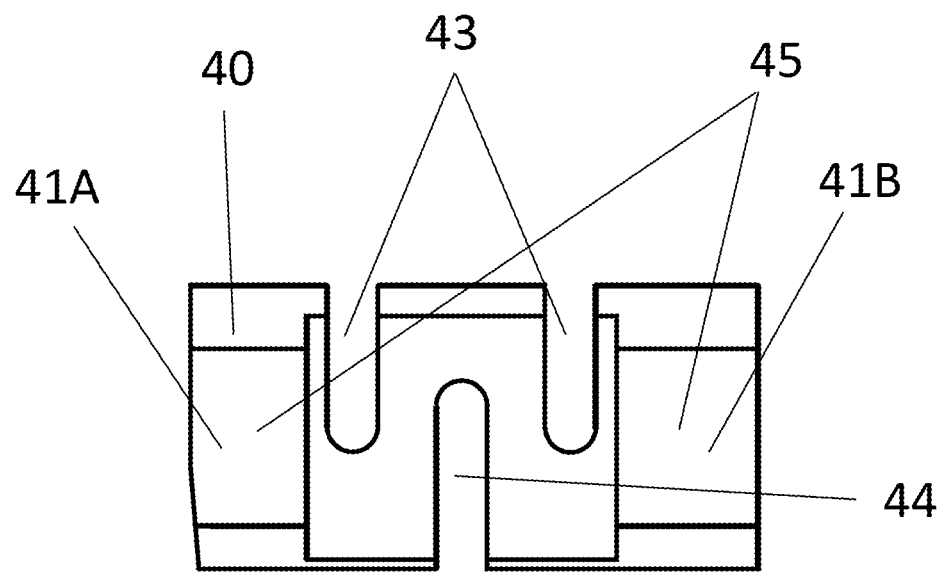
FIG. 5A is a side view of the pressing member in the optical connector shown in FIG. 1.
Figure 5B:
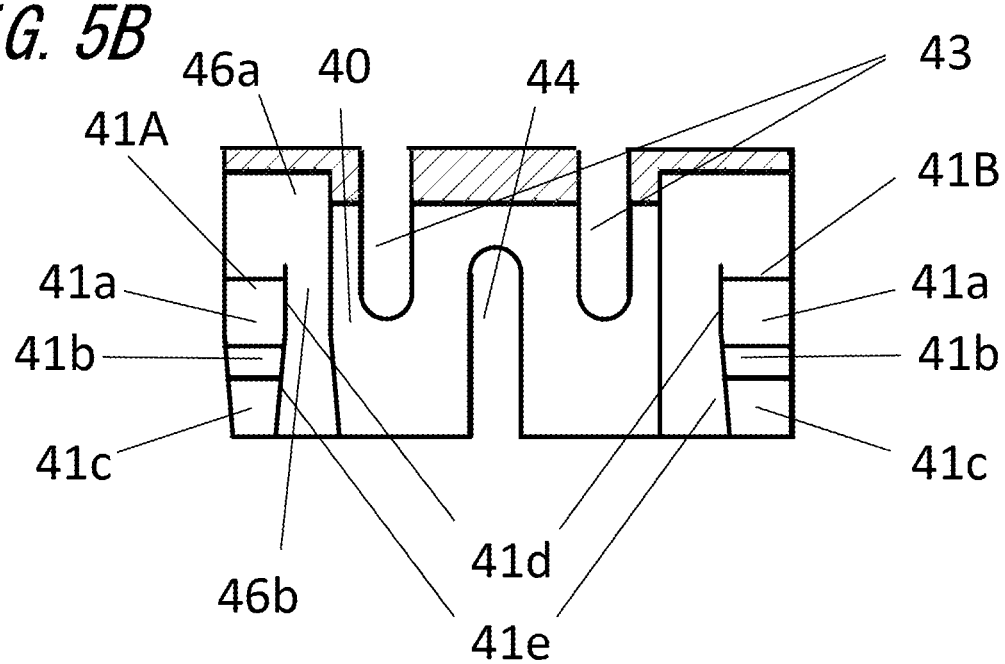
FIG. 5B is a cross-sectional view of the pressing member in the optical connector shown in FIG. 1.
Figure 6A:
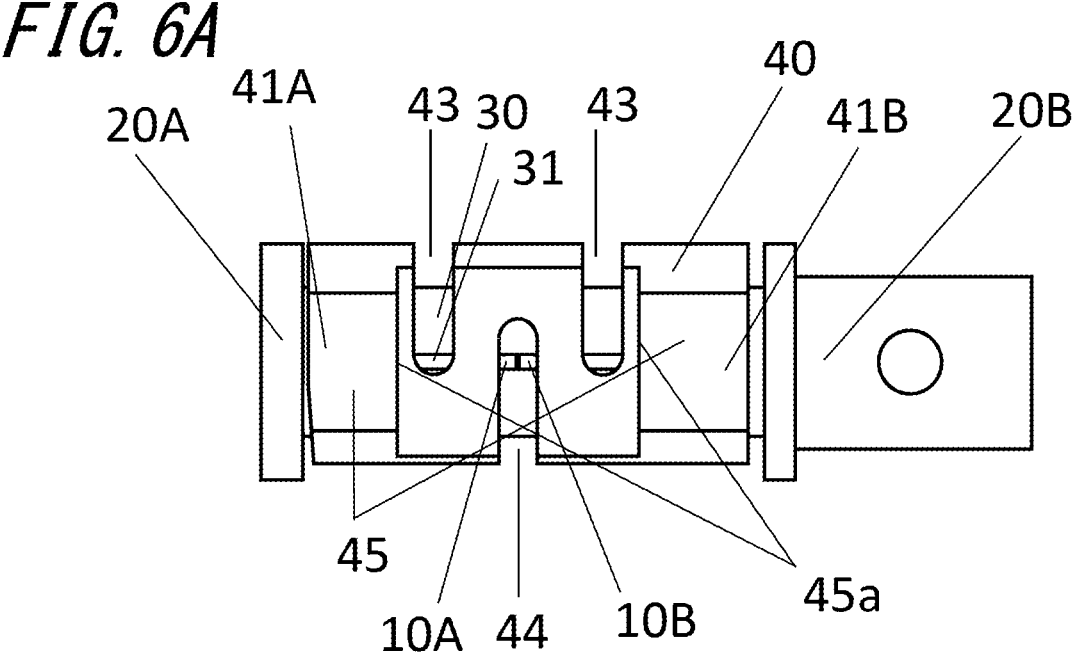
FIG. 6A is a side view of the optical connector shown in FIG. 1.
Figure 6B:
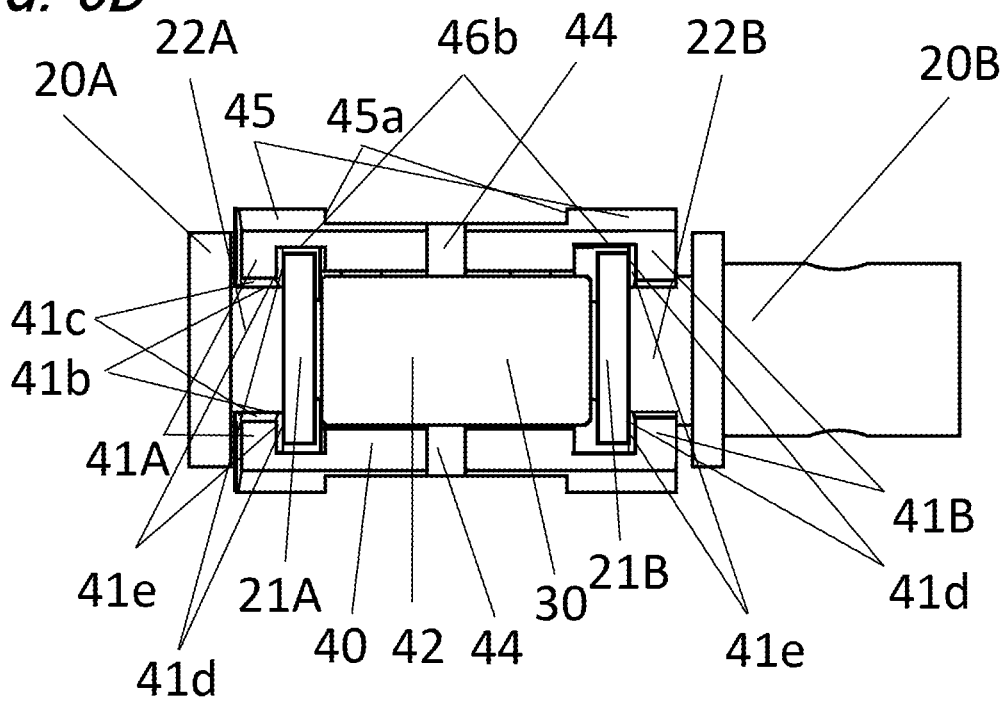
FIG. 6B is a bottom view of the optical connector shown in FIG. 1.

The pressing member 40 will now be described with reference to FIGS. 4 to 7E. FIG. 4 is a perspective view of the pressing member in the optical connector shown in FIG. 1 as viewed from below. FIG. 5A is a side view of the pressing member in the optical connector shown in FIG. 1, and FIG. 5B is a cross-sectional view of the pressing member in the optical connector shown in FIG. 1. FIG. 6A is a side view of the optical connector shown in FIG. 1, and FIG. 6B is a bottom view of the optical connector shown in FIG. 1. FIGS. 7A to 7E show modifications of the optical connector shown in FIG. 1.

The pressing member 40 is fitted to prevent the ferrules 10A and 10B from falling out of the sleeve 30 and press the end faces of the ferrules 10A and 10B at the second ends X2 into close contact with each other. The pressing member 40 may have a length of 5 to 6 mm, a vertical dimension (height) of about 2 to 4 mm, and a depth dimension (width) of about 3 to 5 mm in the figures.

The pressing member 40 has the opening 42 across its length. The pressing member 40 in the optical connector according to the present embodiment has the opening 42 at the bottom and has a U-shaped cross section that opens downward. The pressing member 40 is fitted to the holders 20A and 20B with the opening 42 to cover the joint between the two holders 20A and 20B along the sleeve 30. More specifically, the pressing member 40 is moved downward while being slightly expanded in a longitudinal direction under an external force applied with a jig, and thus the sleeve 30 and the holders 20A and 20B are inserted in the pressing member 40 through the opening 42. Under a gradually smaller external force applied with the jig, the pressing member 40 contracts and is fitted between the two holders 20A and 20B.

The pressing member 40 includes pressing portions 41A and 41B at its longitudinal ends. The pressing portion 41A is at the longitudinal end adjacent to the holder 20A. The pressing portion 41B is at the longitudinal end adjacent to the holder 20B. In the optical connector according to the present embodiment, the pressing portions 41A and 41B each have protrusions extending from right and left inner circumferential surfaces 46b of the pressing member 40 toward the holders 20A and 20B in a direction perpendicular to the longitudinal direction of the pressing member 40.

The pressing portions 41A and 41B each have fitting surfaces 41a, snap surfaces 41b continuous with the fitting surfaces 41a at the ends nearer the opening 42, and relief surfaces 41c continuous with the snap surfaces 41b and adjacent to the opening 42. The pressing portions 41A and 41B also have pressing surfaces 41d facing the sleeve 30 in the longitudinal direction of the pressing member 40, and relief surfaces 41e continuous with the pressing surfaces 41d and adjacent to the opening 42.

The pressing portions 41A and 41B are fitted on the bodies 22A and 22B of the holders 20A and 20B on the fitting surfaces 41a. The fitting surfaces 41a are curved along the outer circumferential surfaces of the holder bodies 22A and 22B. In the optical connector according to the present embodiment, the bodies 22A and 22B of the holders 20A and 20B are cylindrical, and thus the fitting surfaces 41a are concave and arc-shaped as viewed in the longitudinal direction of the pressing member 40. FIG. 6B, which is a bottom view of the optical connector shown in FIG. 1, shows the pressing member 40 viewed from below, and thus does not show the fitting surfaces 41a.

To prevent the inner circumferential surfaces 46b of the pressing member 40 from coming in contact with the holders 20A and 20B after the pressing member 40 is fitted on the holders 20A and 20B, the right and left inner circumferential surfaces 46b of the pressing member 40 as viewed in the longitudinal direction have a distance between them slightly greater than the diameter of the flanges 21A and 21B about the central axis of the holders 20A and 20B. For example, when the flanges 21A and 21B about the central axis of the holders 20A and 20B have a diameter of 3 mm, the right and left inner circumferential surfaces 46b of the pressing member 40 may have a distance between them slightly greater than 3 mm as viewed in the longitudinal direction.

To prevent a ceiling surface 46a of the pressing member 40 from coming in contact with the flanges 21A and 21B of the holders 20A and 20B after the pressing member 40 is fitted on the holders 20A and 20B, the ceiling surface 46a of the pressing member 40 has an appropriate height from the central axis of the holders 20A and 20B. For example, when the flanges 21A and 21B about the central axis of the holders 20A and 20B have a radius of 1.5 mm, the ceiling surface 46a of the pressing member 40 has a height greater than 1.5 mm from the central axis of the holders 20A and 20B as viewed in the longitudinal direction.

The pressing portions 41A and 41B have smaller dimensions in the longitudinal direction of the pressing member 40 than the bodies 22A and 22B of the holders 20A and 20B in the longitudinal direction of the pressing member 40, or may have dimensions of about 0.5 to 0.8 mm.

The pressing surfaces 41d of the pressing portions 41A and 41B are in contact with the surfaces of the flanges 21A and 21B of the holders 20A and 20B opposite to the sleeve 30. The pressing surfaces 41d of the pressing portions 41A and 41B respectively press the holders 20A and 20B toward the sleeve 30.

The relief surfaces 41c of the pressing portions 41A and 41B slope toward the opening 42 to increase the distance between the opposing relief surfaces 41c. Unlike a pressing member without a relief surface, the relief surfaces 41c widen the opening 42 and facilitate insertion of the holders 20A and 20B into the pressing member 40.

The opposing snap surfaces 41b of each of the pressing portions 41A and 41B are parallel to each other before the pressing member 40 is fitted on the holders 20A and 20B. The distance between the snap surfaces 41b is slightly smaller than the outer diameter of the bodies 22A and 22B of the holders 20A and 20B. When the pressing member 40 is fitted on the holders 20A and 20B, the snap surfaces 41b slide on the bodies 22A and 22B of the holders 20A and 20B. For the pressing member 40 produced by injection molding with a die, for example, the die may be reshaped to appropriately resize the protrusions in the pressing portions 41A and 41B extending from the inner circumferential surfaces 46b toward the holders 20A and 20B in a direction perpendicular to the longitudinal direction of the pressing member 40. This allows the snap surfaces 41b to have an intended distance between them. A smaller distance between the snap surfaces 41b can increase frictional resistance in fitting the pressing member 40. A larger distance between the snap surfaces 41b can reduce frictional resistance in fitting the pressing member 40. Thus, the distance between the snap surfaces 41b can be changed to optimize the frictional resistance in fitting the pressing member 40.

The pressing member 40 has first slits 43 and second slits 44. The first slits 43 are located between the two pressing portions 41A and 41B and extend from positions opposite to the opening 42 toward the opening 42. The second slits 44 are located at positions longitudinally separated from the first slits 43 between the two pressing portions 41A and 41B, and extend from positions adjacent to the opening 42 toward positions away from the opening 42.

The first slits 43 and the second slits 44 between the two pressing portions 41A and 41B allow the pressing member 40 to expand in the longitudinal direction along the sleeve 30 under an external force applied with a jig, and then allow the pressing member 40 to contract to an initial state as the external force applied with the jig is released. In this manner, the pressing member 40 can expand and contract in the longitudinal direction along the sleeve 30 when and after the pressing member is fitted. This prevents the pressing portions 41A and 41B from pressing the flanges 21A and 21B of the holders 20A and 20B in a direction easily deviating from or tilting with respect to a direction parallel to the central axis of the ferrules 10A and 10B. In this state, the central axis of the ferrules 10A and 10B in the sleeve 30 is less likely to tilt with respect to the central axis of the sleeve 30. This allows the end faces of the second ends X2 of the ferrules 10A and 10B to be placed into close contact with each other when they abut against each other with their central axis parallel to the central axis of the sleeve 30. The close contact can prevent an air space between the ferrules 10A and 10B and also between the end faces of the optical fibers 11A and 11B. Thus, optical reflection cannot easily occur at the interface between an air space and the end faces of the optical fibers 11A and 11B, and optical signal transmission loss can be reduced. The first slits 43 and the second slits 44 may each have a depth of about 30 to 80% of the vertical dimension (height) of the pressing member 40, or may have a depth of about 1 to 2 mm. The first slits 43 and the second slits 44 may each have a depth of about 0.3 to 0.7 mm.

The pressing member 40 is formed from an insulating material. Examples of the insulating material may include amorphous resins such as polycarbonate (PC) resin, polysulfone (PSF) resin, PES resin, and PEI resin or crystalline resins such as polyacetal (POM) resin, polyethylene terephthalate (PET) resin, and polyetheretherketone (PEEK) resin. Examples of the insulating material may include a ceramic material such as zirconia. The pressing member 40 may be wooden. The pressing member 40 formed from an insulating material can prevent electrical noise from propagating to the optical module 50 through the pressing member 40 when the holders 20A and 20B are formed from a metal material. This stabilizes the electrical characteristics of the light-emitting device 51 or the light-receiving device in the optical module 50, and enables the light-emitting device 51 to stably transmit optical signals and the light-receiving device to stably receive optical signals.

The pressing member 40 may be formed from a metal material such as stainless steel or a conductive resin such as carbon fiber reinforced plastics (CFRP). For the pressing member 40 formed from such a conductive material, the holders 20A and 20B may be formed from an insulating ceramic material such as aluminum oxide, glass materials, for example, crystallized glass such as Li$_2$O—Al$_2$O$_3$—SiO$_2$ or amorphous glass such as borosilicate glass, or an insulating resin material such as PES resin to prevent electrical noise from propagating to the optical module 50 through the pressing member 40. This also stabilizes the electrical characteristics of the light-emitting device 51 or the light-receiving device in the optical module 50, and enables the light-emitting device 51 to stably transmit optical signals and the light-receiving device to stably receive optical signals.

The pressing member 40 may have more first slits 43 than second slits 44. In this case, the pressing member 40 can easily have the same degree of expandability between its portion adjacent to the opening 42 and its portion opposite to the opening 42 when and after fitted to the holders 20A and 20B. This stabilizes the direction in which the pressing portions 41A and 41B press the flanges 21A and 21B of the holders 20A and 20B, and prevents the pressing direction from easily deviating from or tilting with respect to a direction parallel to the central axis of the ferrules 10A and 10B. This effectively allows the central axis of the ferrules 10A and 10B in the sleeve 30 to be less likely to tilt with respect to the central axis of the sleeve 30. Optical signal transmission loss can thus be reduced.

The pressing member 40 in the optical connector according to the present embodiment has two first slits 43 and a pair of second slits 44. In other words, the number of first slits 43 is larger than the number of second slits 44. In this case, the pair of second slits 44 is located at the substantial center of the pressing member 40, and the two first slits 43 are located on both sides of the pair of second slits 44, or one first slit 43 is between the pair of second slits 44 and one end of the pressing member 40, and the other first slit 43 is between the pair of second slits 44 and the other end of the pressing member 40. After the pressing member 40 is fitted to the holders 20A and 20B, the pressing portions 41A and 41B press the flanges 21A and 21B of the holders 20A and 20B toward the sleeve 30 with substantially the same degree of force. This allows the end faces of the optical fibers 11A and 11B to be in close contact with each other in the sleeve 30 with high accuracy, further reducing optical signal transmission loss.

Figure 7A:
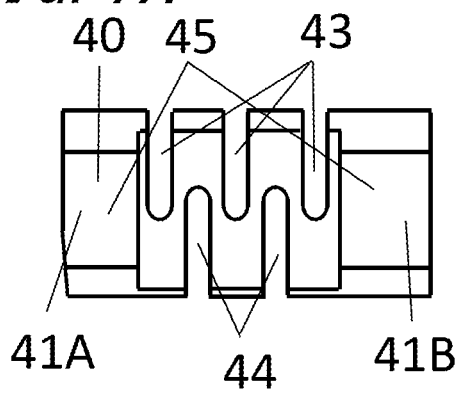
FIGS. 7A to 7E show modifications of the optical connector shown in FIG. 1.

The pressing member 40 may have more first slits 43 than second slits 44 by at least one slit, with the second slits 44 located between the first slits 43. More specifically, as in the pressing member 40 in the optical connector according to the present embodiment, the pressing member 40 may have two first slits 43 and one pair of second slits 44, with the pair of second slits 44 located between the two first slits 43. In some embodiments, as shown in FIG. 7A, the pressing member 40 may have three first slits 43 and two second slits 44. In other embodiments, the pressing member 40 may have a second slit 44 outside two first slits 43 and adjacent to the flange 21A of the holder 20A or adjacent to the flange 21B of the holder 20B rather than between the first slits 43.

Figure 7D:
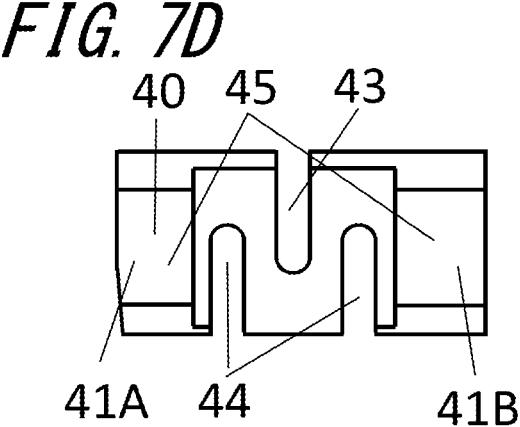
Figure 7B:
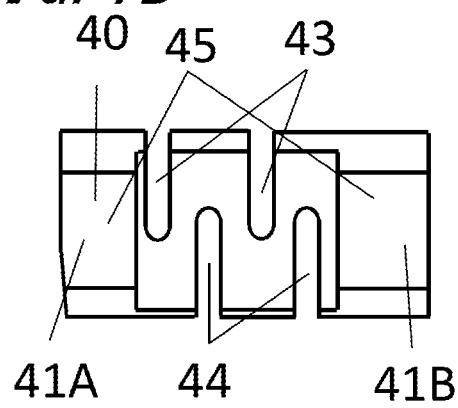

The pressing member 40 may also have as many first slits 43 as second slits 44. In this case, when the pressing member 40 is viewed in a direction perpendicular to both the longitudinal direction and the vertical direction with the opening 42 facing downward, the first slits 43 and the second slits 44 appear at different positions between when the pressing member 40 is viewed with the pressing portion 41A left and the pressing portion 41B right, and when the pressing member 40 is viewed with the pressing portion 41A right and the pressing portion 41B left. For the pressing member 40 with one end predetermined to be fitted to the holder 20A and the other end predetermined to be fitted to the holder 20B, the pressing member 40 with the end fitted to the holder 20A can be readily identified by checking the first slits 43 and the second slits 44 in a side surface of the pressing member 40. This improves the workability of fitting. More specifically, as shown in FIG. 7B, the pressing member 40 may have two first slits 43 and two second slits 44 alternating in the longitudinal direction of the pressing member 40. In this case, for example, one end of the pressing member 40 adjacent to a first slit 43 may be predetermined as the optical signal transmission end, and the other end adjacent to a second slit 44 may be predetermined as the optical signal reception end. This allows easy identification of the transmission direction of optical signals through the optical connector after the pressing member 40 is fitted to the holders 20A and 20B. The two second slits 44 may be located between or outside the two first slits 43.

Figure 7E:
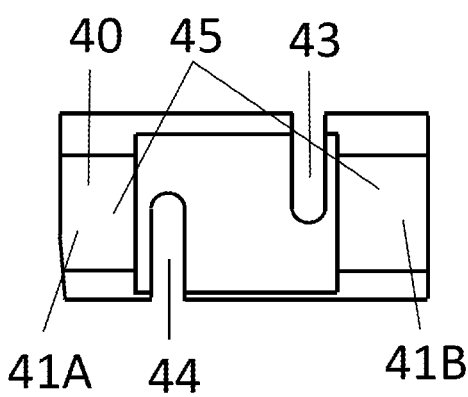
Figure 7C:
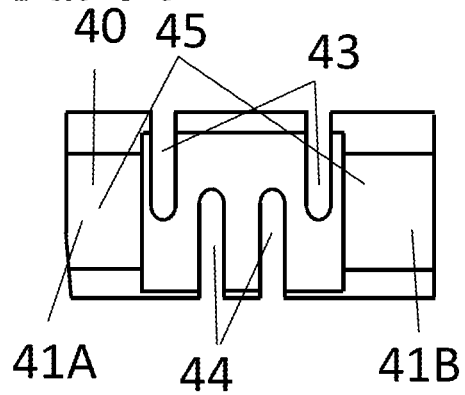

As shown in FIG. 7C, the pressing member 40 may have two second slits 44 located between two first slits 43 with the two first slits 43 at substantially the same distance from the center of the pressing member 40 and the two second slits 44 at substantially the same distance from the center of the pressing member 40. In this case, the end of the pressing member 40 to be fitted to the holder 20A cannot be readily identified by checking the first slits 43 and the second slits 44 in a side surface of the pressing member 40. However, the pressing portions 41A and 41B in this case press the flanges 21A and 21B of the holders 20A and 20B toward the sleeve 30 with substantially the same degree of force after the pressing member 40 is fitted to the holders 20A and 20B. This allows the end faces of the optical fibers 11A and 11B to be in close contact with each other in the sleeve 30 with high accuracy, further reducing optical signal transmission loss.

The pressing member 40 may also have more second slits 44 than the first slits 43. When fitted, this pressing member 40 can be expanded in the longitudinal direction with a jig more easily in its portion adjacent to the opening 42 than in its portion opposite to the opening 42. This facilitates fitting of the pressing member 40 to the holders 20A and 20B.

The pressing member 40 may have more second slits 44 than first slits 43 by at least one slit, with the first slits 43 located between the second slits 44. More specifically, as shown in FIG. 7D, the pressing member 40 may have one first slit 43 and two second slits 44, with the first slit 43 located between the second slits 44. In some embodiments, the pressing member 40 may have two first slits 43 outside two second slits 44 and adjacent to the holder 20A or adjacent to the holder 20B rather than between the second slits 44.

In the pressing member 40, a first slit 43 may have a depth beyond the central axis of the sleeve 30. In this state, the first slit 43 has a lower end below the central axis of the sleeve 30 as the pressing member 40 is viewed in a direction perpendicular to both the longitudinal direction and the vertical direction.

When and after the pressing member 40 is fitted, stress may concentrate on and around the distal end of the first slit 43 in the pressing member 40. For a shallow first slit 43, the portion of the pressing member 40 opposite to the opening 42 is less likely to deform, and stress may concentrate on and around the distal end of the first slit 43 in the pressing member 40. For a first slit 43 having a depth beyond the center line of the sleeve 30, the portion of the pressing member 40 opposite to the opening 42 is deformable to sufficiently reduce the stress concentration on and around the distal end of the first slit 43 in the pressing member 40. Thus, the pressing member 40 is less likely to break under stress.

A first slit 43 with a depth beyond the center line of the sleeve 30 may have a distal end located in the middle between the central axis of the sleeve 30 and the opening 42. A first slit 43 having a distal end too close to the opening 42 may have a distal end too close to the lower end of the pressing member 40. When the pressing member 40 is expanded during fitting, the pressing member 40 may be susceptible to breakage at or around the distal end of the first slit 43. In contrast, a first slit 43 having a depth beyond the center line of the sleeve 30 may have a distal end located in the middle between the central axis of the sleeve 30 and the opening 42, thus lowering the likelihood of such breakage of the pressing member 40.

In the pressing member 40, each second slit 44 may have a depth beyond the central axis of the sleeve 30. In this state, each second slit 44 has an upper end above the central axis of the sleeve 30 as the pressing member 40 is viewed in a direction perpendicular to both the longitudinal direction and the vertical direction.

When and after the pressing member 40 is fitted, stress may also concentrate on and around the distal end of each second slit 44 in the pressing member 40. For shallow second slits 44, the portion of the pressing member 40 adjacent to the opening 42 is less likely to deform, and stress may concentrate on and around the distal end of each second slit 44 in the pressing member 40. In contrast, second slits 44 each having a depth beyond the center line of the sleeve 30 may cause the portion of the pressing member 40 adjacent to the opening 42 to be deformable to sufficiently reduce the stress concentration on and around the distal end of each second slit 44 in the pressing member 40. Thus, the pressing member 40 is less likely to break under stress.

Each second slit 44 with a depth beyond the center line of the sleeve 30 may have a distal end located in the middle between the central axis of the sleeve 30 and the upper surface opposite to the opening 42.

In the pressing member 40, a first slit 43 and a second slit 44 may both have a depth beyond the center line of the sleeve 30. The pressing member 40 is expandable particularly in the longitudinal direction under an external force applied with a jig. The first slit 43 and the second slit 44 may have their depths beyond the center line to the same degree. In this case, the portion of the pressing member 40 adjacent to the opening 42 and the portion opposite to the opening 42 can expand and contract to the same degree. This prevents the pressing portions 41A and 41B from pressing the flanges 21A and 21B of the holders 20A and 20B in a direction easily deviating from or tilting with respect to a direction parallel to the central axis of the ferrules 10A and 10B. In this state, the central axis of the ferrules 10A and 10B in the sleeve 30 is less likely to tilt with respect to the central axis of the sleeve 30.

When the pressing member 40 has two or more first slits 43 and two or more of second slits 44, some of these slits may have depths beyond the center line of the sleeve 30, all the slits may have depths beyond the center line of the sleeve 30, or all the first or second slits may have depths beyond the center line of the sleeve 30 and some of the remaining slits may have depths beyond the center line of the sleeve 30.

The pressing member 40 may also have protrusions 45 protruding outward on the outer circumferences nearer the longitudinal ends than the first slits 43 and the second slits 44. The protrusions 45 extend outward from a central part to the ends.

Each protrusion 45 has a step surface 45a stepped adjacent to the central part of the pressing member 40. The step surface 45a may be used to expand the pressing member 40 in a longitudinal direction parallel to the central axis of the sleeve 30 with an appropriate jig hooked onto the surface. To hook the jig onto the step surface 45a of the protrusion 45, the protrusion 45 may protrude outward by, for example, 0.1 mm or more. The protrusion 45 may have a vertical dimension of 20% or more of the vertical dimension (height) of the pressing member 40, or a longitudinal dimension of 0.3 mm or more. The protrusion 45 protrudes outward on the outer circumference at a longitudinal end of the pressing member 40 and extends from the central part to the end. In this structure, the portion adjacent to the opening 42 and the portion opposite to the opening 42 may be sloped to reduce the radial dimensions as the pressing member 40 is viewed in the direction of the central axis of the sleeve 30.

The protrusions 45 on the pressing member 40 may allow, for example, an appropriate jig to be hooked on the step surface 45a adjacent to the central part of the pressing member 40 to expand the pressing member 40 in a longitudinal direction parallel to the central axis of the sleeve 30. This prevents the fitted pressing portions 41A and 41B from pressing the flanges 21A and 21B of the holders 20A and 20B in a tilting direction, while allowing the pressing member 40 to be easily fitted to and removed from the holders 20A and 20B.

The protrusions 45 may be on both sides of the pressing member 40. In this case, the pressing member 40 can be more reliably expanded in a longitudinal direction parallel to the central axis of the sleeve 30. This prevents the fitted pressing portions 41A and 41B from pressing the flanges 21A and 21B of the holders 20A and 20B in a tilting direction, while allowing the pressing member 40 to be easily fitted to and removed from the holders 20A and 20B.

The protrusion 45 may have the step surface 45a perpendicular to the central axis of the sleeve 30. In this case as well, the pressing member 40 can be expanded more reliably in a longitudinal direction parallel to the central axis of the sleeve 30. This prevents the fitted pressing portions 41A and 41B from pressing the flanges 21A and 21B of the holders 20A and 20B in a tilting direction, while allowing the pressing member 40 to be easily fitted to and removed from the holders 20A and 20B.

The insulating material for the pressing member 40 may be an amorphous resin. Amorphous resins have lower elastic moduli than crystalline resins. The pressing member 40 formed from an amorphous resin is less susceptible to stress concentration at a specific position during expansion or contraction. Thus, the pressing member 40 is less susceptible to breakage under stress. Additionally, amorphous resins at high temperatures have more stable elastic moduli than crystalline resins. For example, when the optical connector reaches a high temperature under heat generated by the light-emitting device 51 in the optical module 50, the pressing member 40 formed from an amorphous resin can retain its elastic modulus and the force of pressing the flanges 21A and 21B. This reduces misalignment between the optical fibers 11A and 11B during use of the optical connector, and reduces deterioration of the optical signal transmission characteristics.

The pressing member 40 may be produced by, for example, injection molding with a die. Any other resin molding may also be used.

The embodiment of the present invention may be modified as appropriate. The pressing member 40 may have any structure including at least one first slit 43 and at least one second slit 44 at positions separated from each other in the longitudinal direction of the pressing member 40. For example, as shown in FIG. 7E, the pressing member 40 may have one first slit 43 and one second slit 44. In this case as well, the pressing member 40 when and after fitted expands or contracts in the longitudinal direction along the sleeve 30. This prevents the pressing portions 41A and 41B from pressing the flanges 21A and 21B of the holders 20A and 20B in a direction easily deviating from or tilting with respect to a direction parallel to the central axis of the ferrules 10A and 10B. In this state, the central axis of the ferrules 10A and 10B in the sleeve 30 is less likely to tilt with respect to the central axis of the sleeve 30. This allows the second ends X2 of the ferrules 10A and 10B to be placed into close contact with each other when they abut against each other with their central axis parallel to the central axis of the sleeve 30. The close contact can prevent an air space between the ferrules 10A and 10B and also between the end faces of the optical fibers 11A and 11B. Thus, optical reflection cannot easily occur at the interface between an air space and the end faces of the optical fibers 11A and 11B, and optical signal transmission loss can be reduced.

The longitudinal expandability of the pressing member 40 under an external force applied with a jig increases as the pressing member 40 has more first slits 43 and more second slits 44, and the first slits 43 and the second slits 44 are deeper and wider. However, the pressing member 40 more expandable in a longitudinal direction may have a smaller force pressing the holders 20A and 20B toward the sleeve 30 when the pressing member 40 contracts after release of the external force. To avoid the difficulty, the force of the pressing member 40 pressing the holders 20A and 20B may be adjusted to fall within a range of 5 to 6 N defined in the International Electrotechnical Commission (IEC) Standards. To achieve this, the dimensions of each portion may be determined in accordance with the elastic modulus of the material for the pressing member 40, and the numbers of first slits 43 and second slits 44 and their depths and widths may be adjusted accordingly.

When the pressing member 40 receives an external force applied with a jig, its portion opposite to the opening 42 is more expandable in the longitudinal direction of the pressing member 40 as the pressing member 40 has more first slits 43, and its portion opposite to the opening 42 is more expandable in the longitudinal direction of the pressing member 40 as the pressing member 40 has deeper first slits 43. The portion adjacent to the opening 42 is more expandable in the longitudinal direction of the pressing member 40 as the pressing member 40 has more second slits 44. The portion adjacent to the opening 42 is more expandable in the longitudinal direction of the pressing member 40 as the pressing member 40 has deeper second slits 44. The numbers of first slits 43 and second slits 44 and their widths and depths may be adjusted accordingly to enable the pressing portions 41A and 41B of the pressing member 40 to press the flanges 21A and 21B of the holders 20A and 20B in a direction parallel to the central axis of the ferrules 10A and 10B.

In the optical connector according to the present embodiment, the pressing portions 41A and 41B each have the protrusions extending from the right and left inner circumferential surfaces 46b of the pressing member 40 toward the holders 20A and 20B in a direction perpendicular to the longitudinal direction of the pressing member 40. However, the protrusions may instead extend from the right and left inner circumferential surfaces 46b and the ceiling surface 46a of the pressing member 40 toward the holders 20A and 20B in directions perpendicular to the longitudinal direction of the pressing member 40. The protrusions may be in three-point contact with the surface of the flange 21A opposite to the sleeve 30 and press the holder 20A, and may be in three-point contact with the surface of the flange 21B opposite to the sleeve 30 and press the holder 20B.

In the optical connector according to the present embodiment, the pressing portions 41A and 41B have the pressing surfaces 41d in contact with the surfaces of the flanges 21A and 21B opposite to the sleeve 30. However, the pressing portions 41A and 41B may instead have portions that are not flat but protrude in contact with the surfaces of the flanges 21A and 21B opposite to the sleeve 30.

REFERENCE SIGNS LIST 10A, 10B ferrule
X1 first end
X2 second end
11A, 11B optical fiber
20A, 20B holder
21A, 21B flange
30 sleeve
40 pressing member
41A, 41B pressing portion
42 opening
43 first slit
44 second slit

The invention claimed is:

1. An optical connector, comprising:
two ferrules each having a first end, wherein each ferrule has an optical fiber with a tip of the optical fiber inserted through the first end;
two holders each having a flange, wherein each flange is located on an outer circumferential surface of a corresponding one of the two ferrules at the first end;
a sleeve having tubular two ends through which second ends of the two ferrules are inserted into the sleeve, wherein the sleeve causes end faces of the optical fiber of each of the two ferrules to face each other and the second ends of the ferrules to abut against each other; and
a pressing member fitted between the two holders along the sleeve, wherein the pressing member includes:
two pressing portions in contact with surfaces of the flanges opposite to the sleeve, the pressing portions pressing the two holders toward the sleeve,
a longitudinal opening with which the pressing member is fitted to cover a joint between the two holders along the sleeve,
a first number of first slits extending from a position opposite to an opening toward the opening, and
a second number of second slits that separated longitudinally from the at least one first slit and extending from a position adjacent to the opening toward a position away from the opening,
wherein the first slits and the second slits are located between the two pressing portions, and
wherein at least one of the first slits and the second slits have a depth beyond a central axis of the sleeve.

2. The optical connector according to claim 1, wherein both of the first slits and the slits have a depth beyond the central axis of the sleeve.

3. The optical connector according to claim 1, wherein the first number and the second number are equal.

4. The optical connector according to claim 1, wherein the pressing member includes, at an outer circumference thereof nearer a longitudinal end than the at least one first slit or the at least one second slit, a protrusion extending outward from a central part to the end.

5. The optical connector according to claim 1, wherein the pressing member comprises an insulating material.

6. The optical connector according to claim 5, wherein the insulating material comprises an amorphous resin.

7. The optical connector according to claim 1, wherein the first slits extend from a portion of the pressing member opposite to the opening toward the opening in two directions perpendicular to a longitudinal direction of the pressing member.

8. An optical connector comprising:
two ferrules each having a first end, wherein each ferrule has an optical fiber with a tip of the optical fiber inserted through the first end;
two holders each having a flange, wherein each flange is located on an outer circumferential surface of a corresponding one of the two ferrules at the first end;
a sleeve having tubular two ends through which second ends of the two ferrules are inserted into the sleeve, wherein the sleeve causes end faces of the optical fiber of each of the two ferrules to face each other and the second ends of the ferrules to abut against each other; and
a pressing member fitted between the two holders along the sleeve, wherein the pressing member includes:
two pressing portions in contact with surfaces of the flanges opposite to the sleeve, the pressing portions pressing the two holders toward the sleeve,
a longitudinal opening with which the pressing member is fitted to cover a joint between the two holders along the sleeve,
a first number of first slits extending from a position opposite to an opening toward the opening, and
a second number of second slits that separated longitudinally from the at least one first slit and extending from a position adjacent to the opening toward a position away from the opening, wherein the first number is larger than the second number
wherein the first slits and the second slits are located between the two pressing portions.

9. The optical connector according to claim 8, wherein the pressing member comprises an insulating material.

10. The optical connector according to claim 9, wherein the insulating material comprises an amorphous resin.

11. The optical connector according to claim 8, wherein the slits extend from a portion of the pressing member opposite to the opening toward the opening in two directions perpendicular to a longitudinal direction of the pressing member.

12. The optical connector according to claim 8, wherein both of the first slits and the second slits have a depth beyond a central axis of the sleeve.

13. The optical connector according to claim 8, wherein the pressing member includes, at an outer circumference thereof nearer a longitudinal end than the at least one first slit or the at least one second slit, a protrusion extending outward from a central part to the end.

14. An optical connector comprising:
two ferrules each having a first end, wherein each ferrule has an optical fiber with a tip of the optical fiber inserted through the first end;
two holders each having a flange, wherein each flange is located on an outer circumferential surface of a corresponding one of the two ferrules at the first end;
a sleeve having tubular two ends through which second ends of the two ferrules are inserted into the sleeve, wherein the sleeve causes end faces of the optical fiber of each of the two ferrules to face each other and the second ends of the ferrules to abut against each other; and
a pressing member fitted between the two holders along the sleeve, wherein the pressing member includes:
two pressing portions in contact with surfaces of the flanges opposite to the sleeve, the pressing portions pressing the two holders toward the sleeve,
a longitudinal opening with which the pressing member is fitted to cover a joint between the two holders along the sleeve,
a first number of first slits extending from a position opposite to an opening toward the opening, and
a second number of second slits that separated longitudinally from the at least one first slit and extending from a position adjacent to the opening toward a position away from the opening, wherein the first slits and the second slits are located between the two pressing portions;
wherein the first number is smaller than the second number.

15. The optical connector according to claim 14, wherein the first slits extend from a portion of the pressing member opposite to the opening toward the opening in two directions perpendicular to a longitudinal direction of the pressing member.

16. The optical connector according to claim 14, wherein the pressing member comprises an insulating material.

17. The optical connector according to claim 16, wherein the insulating material comprises an amorphous resin.

18. The optical connector according to claim 14, wherein the pressing member includes, at an outer circumference thereof nearer a longitudinal end than the first slits or the second slits, a protrusion extending outward from a central part to the end.

19. The optical connector according to claim 14, wherein both of the first slits and the second slits have a depth beyond a central axis of the sleeve.

* * * * *